United States Patent [19]

Schwenninger

[11] 3,853,524

[45] Dec. 10, 1974

[54] BUBBLER FOR A GLASS MELTING FURNACE

[75] Inventor: Ronald L. Schwenninger, Cumberland, Md.

[73] Assignee: PPG Industries Inc., Pittsburgh, Pa.

[22] Filed: Feb. 14, 1974

[21] Appl. No.: 442,524

[52] U.S. Cl.................................... 65/178, 65/374
[51] Int. Cl............................................ C03b 5/18
[58] Field of Search............. 65/178, 179, 180, 374

[56] References Cited
UNITED STATES PATENTS

| | | | |
|---|---|---|---|
| 3,206,291 | 9/1965 | Penberthy | 65/178 X |
| 3,230,060 | 1/1966 | Lippmann | 65/374 X |
| 3,669,435 | 6/1972 | Silverberg | 65/179 X |

Primary Examiner—Arthur R. Kellogg
Attorney, Agent, or Firm—Russell A. Eberly

[57] ABSTRACT

This invention relates to an improved bubbler used with glass melting furnaces. The bubbler includes a monolithic molybdenum tube having a passageway therethrough. The outer surface of the tube and the wall of the passageway are coated with molybdenum disilicide.

2 Claims, 2 Drawing Figures

000
BUBBLER FOR A GLASS MELTING FURNACE

BACKGROUND OF THE INVENTION

1. Field of the Invention

This invention relates to bubblers used in glass melting furnaces.

2. Discussion of the Prior Art and Technical Problems

The advantages of using bubblers in glass melting furnaces have been recognized in the prior art.

In general, the prior art teaches the use of bubblers constructed of a molybdenum tube advantageously joined to a stainless steel tube as by brazing with nickel palladium. A plurality of bubblers so constructed are inserted through the furnace bottom into the molten glass. An inert atmosphere such as nitrogen is moved through the bubblers to mix the molten glass.

The prior art bubblers have several limitations. More particularly, (1) the joining of the molybdenum tube to the stainless steel tube is expensive; and (2) the bubblers have to be positioned within the furnace bottom at a precise location. The joining of the molybdenum tube to the stainless steel tube is expensive because it requires a specialty brazing, e.g., brazing with nickel palladium. This is so that the joint can withstand high temperatures, e.g., of about 1,700°F., and not fracture as the molybdenum and stainless tubes expand upon heating.

The bubblers have to be positioned within the furnace bottom at a precise location because molybdenum readily oxidizes when heated in air and stainless steel oxidizes at temperatures greater than about 1,700°F. Normally, the bubbler is inserted such that the joint between the molybdenum tube and stainless steel tube is covered with devitrified glass having a temperature of about 1,700°F. with the molybdenum tube extending into the molten glass and the stainless steel tube extending out of the furnace bottom. Further, because the joint of the molybdenum tube and stainless steel tube is preferably covered with devitrified glass, the bubblers have to be custom made for each glass melting furnace to assure that a sufficient length of the bubbler extends into the molten pool of glass.

It would be advantageous, therefore, if a bubbler were available that did not have the prior art limitations.

SUMMARY OF THE INVENTION

This invention relates to an improvement in bubblers of the type mounted in refractories of a glass melting furnace, wherein a portion of the bubbler is to be submerged in a pool of molten glass to be contained in the furnace and a portion of the bubbler extends beyond the refractories to provide access to the bubbler to move a fluid through a passageway in the bubbler into the molten glass. The improvement includes a monolithic molybdenum tube having a passageway and a molybdenum disilicide coating on the outer surfaces of the molybdenum tube. The invention also contemplates coating the wall of the passageway with a molybdenum disilicide coating.

By providing molybdenum disilicide coating on the outer surfaces of the molybdenum tube, the prior art limitations have been eliminated. More particularly, there is no need for brazing a molybdenum tube to a stainless steel tube and there is no need to position the tube at an exact location in the furnace bottom because the molybdenum disilicide protects the molybdenum tube from oxidizing in air.

DETAILED DESCRIPTION OF THE INVENTION

In general, the bubbler of the invention includes a monolithic molybdenum tube having a passageway therethrough and having the outer surface of the tube and wall of the passageway covered with molybdenum disilicide.

Figure 1:
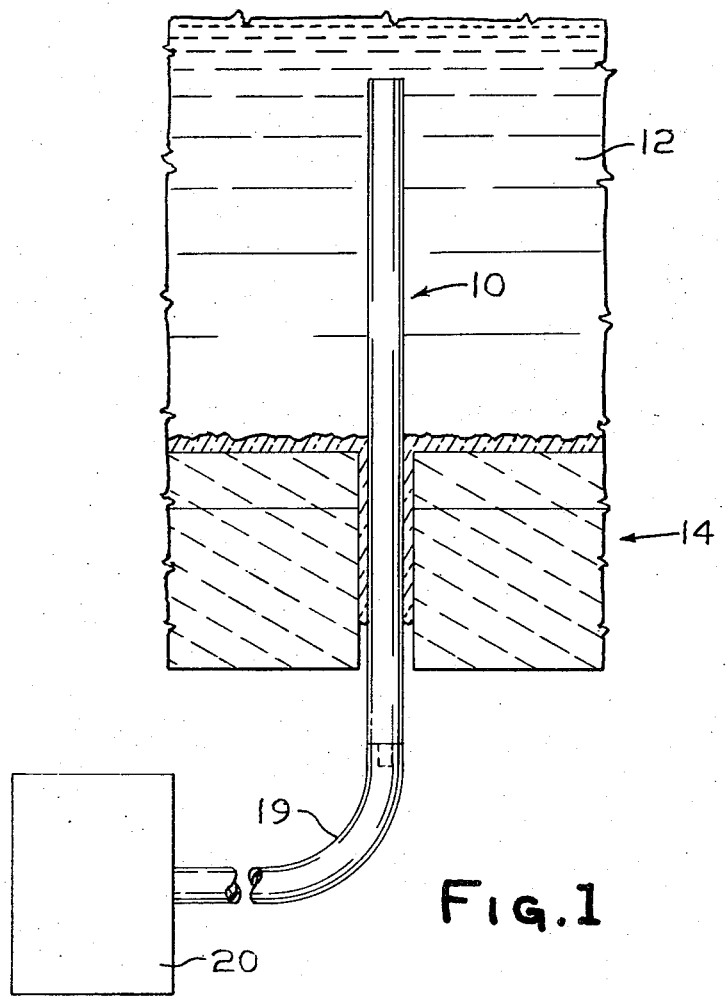
FIG. 1 is a partial cross-sectional view of a glass melting furnace illustrating the bubbler of this invention mounted through the furnace bottom.

With reference to FIG. 1, there is shown a bubbler 10 constructed in accordance to the teachings of the invention for moving a fluid, e.g., air or inert gas such as nitrogen, into a pool of molten glass 12. The bubbler 10 is normally inserted in furnace bottom 14 of the melting section of a glass melting furnace.

Figure 2:
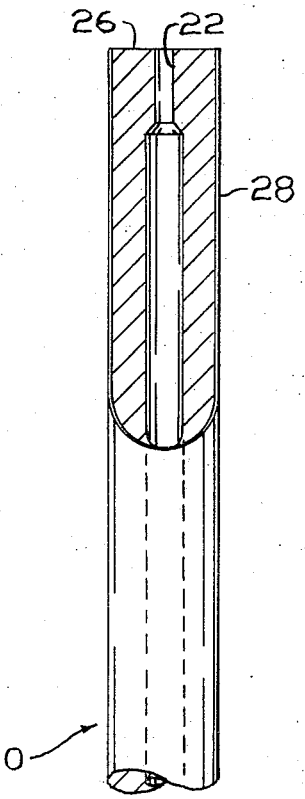
FIG. 2 is an elevated view of the bubbler of this invention having portions removed for purposes of clarity.
Figure 2:
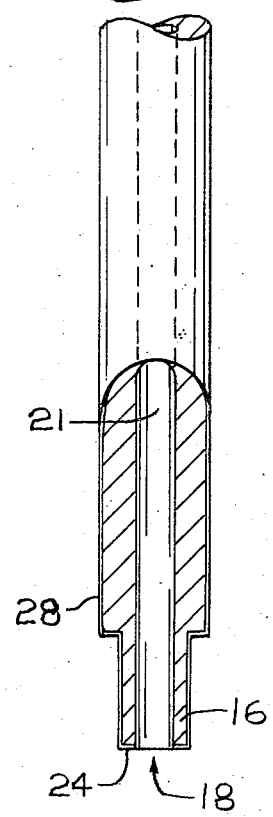

With reference to FIG. 2, the bubbler 10 includes a monolithic molybdenum tube 16 having a passageway 18 extending therethrough. A conduit 19 is advantageously connected at one end to the tube 16 and at the other end to a nitrogen supply 20 (see FIG. 1) to move nitrogen through the bubbler 10 into the molten glass 12 in the form of a series of bubbles which rise through the molten glass.

The passageway 18 includes a first bore 21 and a second bore 22. The first bore 21 normally has an inside diameter (I.D.) of about 9/32 inch and extends from end 24 toward end 26 of the tube 16. The second bore 22 has an I.D. of about 0.0165 inch and extends from end 26 inward for about one inch at which point the I.D. of the second bore 22 gradually increases to the I.D. of the first bore 21.

The outside diameter (O.D.) of the tube 16 is normally about one inch. To provide coupling to the conduit 19 (see FIG. 1), the end 24 may have a reduced O.D., e.g., an O.D. of about ½ inch.

The outer surface of the tube 16 is provided with a coating 28 of a cermet such as molybdenum disilicide to minimize oxidation of the tube, specifically that portion of the tube extending out of the furnace bottom which is exposed to air. The molybdenum disilicide may be coated on the outer surface of the tube in any conventional manner such as taught in U.S. Pat. No. 3,117,846, which teachings are hereby incorporated by reference.

If an oxidizing atmosphere is to be moved through the passageway 18 of the tube 16, it is recommended that the surface of the passageway 18 be similarly coated with molybdenum disilicide.

The recommended thickness of the molybdenum disilicide is at least about 0.002 inch.

As can be appreciated, the invention is not limited to dimensions and/or shape of the bubbler or to the thickness of the molybdenum disilicide coated thereon. The dimensions and shape of the bubbler as well as the coating thickness of the molybdenum disilicide are presented for illustration purposes only.

Using the bubblers of this invention, the limitations of the prior art bubblers are eliminated. More particularly, since the bubbler is of a monolithic construction, the necessity of providing a specialized brazed joint has been eliminated. Secondly, since the molybdenum disilicide does not readily oxidize in the atmosphere, it is not necessary to insert the bubbler within the furnace bottom to a precise location. For example, in the prior art, it was necessary to provide that the bubbler be inserted such that the joint between the molybdenum tube and stainless steel tube be covered with devitrified glass with the molybdenum tube extending into the molten glass and the stainless steel tube extending out of the furnace bottom. The bubbler of this invention has a molybdenum tube that is protected from oxidizing in air by a coating of molybdenum disilicide and therefore does not require special care when mounting in a furnace bottom. Further, the bubbler of this invention eliminates the need for providing custom bubblers because any portion of the tube can extend beyond the furnace bottom and not be oxidized.

What is claimed is:

1. In a bubbler of the type mounted in refractories of a glass melting furnace wherein a portion of the bubbler is to be submerged in a pool of molten glass to be contained in the furnace and a portion of the bubbler extends beyond the refractories to provide access to the bubbler to move a fluid through a passageway in the bubbler into the molten glass, the improvement which comprises:

a monolithic molybdenum tube having a passageway; and a molybdenum disilicide coating on the outer surfaces of said molybdenum tube.

2. The improved bubbler as set forth in claim 1 further including a molybdenum disilicide coating on the wall of the passageway.

* * * * *

UNITED STATES PATENT OFFICE
CERTIFICATE OF CORRECTION

PATENT NO. : 3,853,524

DATED : December 10, 1974

INVENTOR(S) : Ronald L. Schwenninger

It is certified that error appears in the above-identified patent and that said Letters Patent are hereby corrected as shown below:

Column 2, line 36, "0.0165" should be --0.1065--.

Signed and sealed this 15th day of July 1975.

(SEAL)
Attest:

RUTH C. MASON
Attesting Officer

C. MARSHALL DANN
Commissioner of Patents
and Trademarks